United States Patent
Freitag et al.

(10) Patent No.: US 10,943,611 B1
(45) Date of Patent: Mar. 9, 2021

(54) SPINTRONIC DEVICES WITH NARROW SPIN POLARIZATION LAYERS

(71) Applicant: Western Digital Technologies, Inc., San Jose, CA (US)

(72) Inventors: James Mac Freitag, Sunnyvale, CA (US); Zheng Gao, San Jose, CA (US); Susumu Okamura, Fujisawa (JP); Yongchul Ahn, San Jose, CA (US); Aron Pentek, San Jose, CA (US); Amanda Baer, Campbell, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/836,687

(22) Filed: Mar. 31, 2020

(51) Int. Cl.
*G11B 5/235* (2006.01)
*G11B 5/31* (2006.01)
*G11B 5/127* (2006.01)
G11B 5/39 (2006.01)
G11B 5/02 (2006.01)
G11B 5/00 (2006.01)
G11B 5/23 (2006.01)

(52) U.S. Cl.
CPC .......... *G11B 5/3146* (2013.01); *G11B 5/1278* (2013.01); *G11B 5/235* (2013.01); *G11B 5/314* (2013.01); *G11B 5/3116* (2013.01); G11B 5/02 (2013.01); G11B 5/232 (2013.01); G11B 5/315 (2013.01); G11B 5/3153 (2013.01); G11B 5/3983 (2013.01); G11B 2005/0024 (2013.01)

(58) Field of Classification Search
None
See application file for complete search history.

(56) References Cited

U.S. PATENT DOCUMENTS

| | | | |
|---|---|---|---|
| 8,274,811 B2 | 9/2012 | Zhang et al. | |
| 8,325,442 B2 | 12/2012 | Koui et al. | |
| 8,488,373 B2 | 7/2013 | Zhang et al. | |
| 9,001,465 B1 * | 4/2015 | Shimizu et al. | G11B 5/3146 360/125.3 |

(Continued)

OTHER PUBLICATIONS

International Search Report issued in corresponding International Patent Application No. PCT/US2020/035548, dated Aug. 30, 2020 (10 pages).

(Continued)

*Primary Examiner* — Craig A. Renner
(74) *Attorney, Agent, or Firm* — Patterson & Sheridan, LLP; Steven H. Versteeg

(57) ABSTRACT

In one embodiment, a write head includes a spin polarization layer (SPL) over a seed layer. A spacer layer is over the SPL. A trailing shield is over the spacer layer. The spacer layer forms a first interface between the spacer layer and the trailing shield and forms a second interface between the spacer layer and the SPL. The first interface has an area larger than an area of the second interface. In another embodiment, a write head includes a SPL over a spacer layer. A capping layer is over the SPL. A trailing shield is over the capping layer. The spacer layer forms a first interface between the spacer layer and the main pole and forms a second interface between the spacer layer and the SPL. The first interface has an area larger than an area of the second interface.

16 Claims, 7 Drawing Sheets

(56) References Cited

U.S. PATENT DOCUMENTS

| | | | |
|---|---|---|---|
| 9,202,484 B1* | 12/2015 | Watanabe et al. | G11B 5/314 |
| 9,406,315 B2 | 8/2016 | Shiimoto et al. | |
| 10,121,497 B1* | 11/2018 | Takahashi et al. | G11B 5/3146 |
| 10,325,618 B1* | 6/2019 | Wu et al. | G11B 5/1278 |
| 2012/0087045 A1 | 4/2012 | Yanagisawa et al. | |
| 2012/0275061 A1* | 11/2012 | Takagishi et al. | G11B 5/3146 |
| | | | 360/125.03 |
| 2014/0211340 A1 | 7/2014 | Sugiura et al. | |
| 2015/0092292 A1* | 4/2015 | Furukawa et al. | G11B 5/314 |
| | | | 360/59 |
| 2016/0027455 A1* | 1/2016 | Kudo et al. | G11B 5/3146 |
| | | | 360/125.03 |
| 2016/0314809 A1* | 10/2016 | Taguchi et al. | G11B 5/314 |
| 2017/0092304 A1* | 3/2017 | Koizumi et al. | G11B 5/235 |
| 2017/0186450 A1* | 6/2017 | Yamada et al. | G11B 5/3146 |
| 2017/0236537 A1* | 8/2017 | Murakami et al. | G11B 5/1278 |
| | | | 360/125.3 |
| 2018/0261241 A1* | 9/2018 | Narita et al. | G11B 5/3116 |
| 2019/0251992 A1 | 8/2019 | Ho et al. | |
| 2019/0279662 A1 | 9/2019 | Liu et al. | |
| 2019/0279667 A1 | 9/2019 | Freitag et al. | |
| 2019/0295572 A1 | 9/2019 | Olson et al. | |
| 2020/0082845 A1* | 3/2020 | Suto et al. | G11B 5/235 |

OTHER PUBLICATIONS

H. Sepehri-Amin et al.; "Design of spin-injection-layer in all-in-plane spin-torque-oscillator for microwave assisted magnetic recording", Journal of Magnetism and Magnetic Materials, Accepted Manuscript; https://www.sciencedirect.com/science/article/abs/pii/S0304885318335534, (2018) (27 pages).

\* cited by examiner

SPINTRONIC DEVICES WITH NARROW SPIN POLARIZATION LAYERS

BACKGROUND OF THE DISCLOSURE

Field of the Disclosure

Embodiments of the present disclosure generally relate to a write head with a spintronic device.

Description of the Related Art

The heart of the functioning and capability of a computer is the storing and writing of data to a data storage device, such as a hard disk drive (HDD). The volume of data processed by a computer is increasing rapidly. There is a need for higher recording density of a magnetic recording medium to increase the function and the capability of a computer.

In order to achieve higher recording densities, such as recording densities exceeding 1 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic write head at a media facing surface. As the main pole becomes smaller, the writing field becomes smaller as well, limiting the effectiveness of the magnetic write head.

Heat-assisted magnetic recording (HAMR) and microwave assisted magnetic recording (MAMR) are two types of energy-assisted recording technology to improve the recording density of a magnetic recording medium, such as a HDD. In MAMR, a spin torque oscillator (STO) device is located next to or near the write element in order to produce a high-frequency AC field, such as in a microwave frequency band. The high-frequency AC field reduces an effective coercivity of a magnetic recording medium used to store data and allows writing of the magnetic recording medium at lower magnetic writing fields emanated from the write pole. Thus, higher recording density of the magnetic recording medium may be achieved by MAMR technology.

One type of MAMR enabled magnetic recording is based on spin-orbital torque (SOT). During operation, charge current through a spin Hall layer generates a spin current in the spin Hall layer. The spin orbital coupling of the spin Hall layer and a spin torque layer (STL) causes switching or precession of magnetization of the STL by the spin orbital coupling of the spin current from the spin Hall layer. Switching or precession of the magnetization of the STL generates an assisting field to the write field.

Another type of MAMR enabled magnetic recording is based on spin-transfer torque (STT). During operation, electrical current flows from the main pole to the trailing shield through a field generation layer (FGL). Transmitted polarized electrons from a spin polarization layer (SPL) and/or from reflected electrons are injected into the field generation layer causing switching or precession of the magnetization of the field generation layer by spin transfer torque from the injected electrons. Switching or precession of the magnetization of the field generation layer generates an assisting field to the write field.

Alternatively, another enhanced recording option involves a spin torque assisted recording head which provides a spin torque structure in the write gap with an SPL generating a DC field to assist the magnetic recording. This is described in U.S. Pat. No. 10,366,714 B1, titled "Magnetic write head for providing spin-torque-assisted write field enhancement," which is assigned to the assignee of this application.

Energy-assisted recording write heads may require an undesirable high voltage and/or an undesirable high current to produce a write field enhancement. A high voltage and/or high current may impact the lifetime and the reliability of the write head by degrading components of the write head. Therefore, there is a need in the art for an improved write head.

SUMMARY OF THE DISCLOSURE

Embodiments of the present disclosure generally relate to a write head with a spintronic device.

In one embodiment, a write head includes a main pole. A seed layer is over the main pole. A spin polarization layer (SPL) is over the seed layer. A spacer layer is over the SPL. A trailing shield is over the spacer layer. The spacer layer forms a first interface between the spacer layer and the trailing shield and forms a second interface between the spacer layer and the SPL. The first interface has an area larger than an area of the second interface.

In another embodiment, a write head includes a main pole. A spacer layer is over the main pole. A SPL is over the spacer layer. A capping layer is over the SPL. A trailing shield is over the capping layer. The spacer layer forms a first interface between the spacer layer and the main pole and forms a second interface between the spacer layer and the SPL. The first interface has an area larger than an area of the second interface.

In still another embodiments, a write head includes a main pole and a trailing shield. A SPL and a spacer layer are between the main pole and the trailing shield. The spacer layer has a cross-track width larger than a cross-track width of the SPL and/or has and a stripe height larger than a stripe height of the SPL.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a microwave assisted magnetic recording write head with a STT-based STO device. In certain embodiments, a write head includes a narrow SPL and a wide spacer layer providing a high current density at the interface between the SPL and the spacer layer. In certain embodiments, the write head further includes a wide seed layer or a wide capping layer to reduce parasitic resistance of the seed layer or capping layer.

Figure 1:
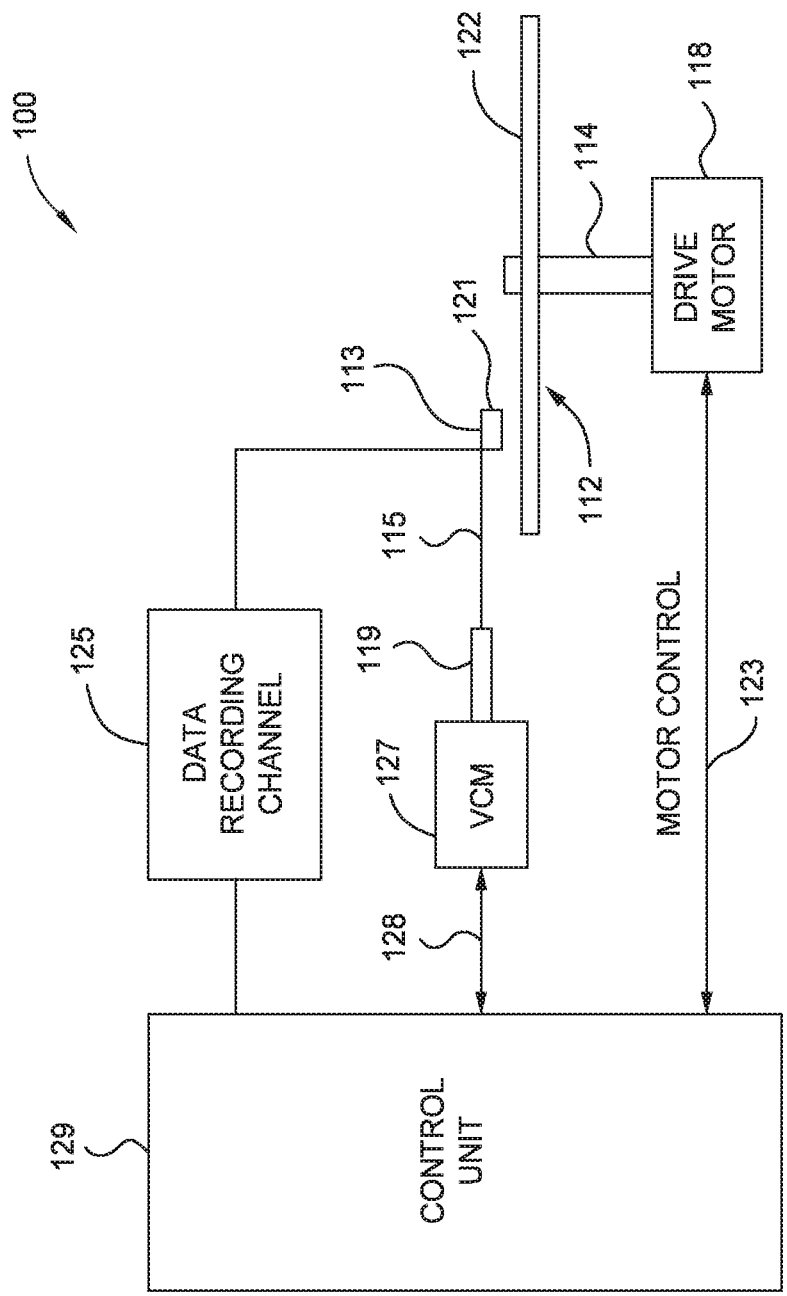
FIG. 1 is a schematic illustration of certain embodiments of a magnetic media drive including a write head.

FIG. 1 is a schematic illustration of certain embodiments of a magnetic media drive including a magnetic write head, such as a head. Such magnetic media drive may be a single drive/device or comprise multiple drives/devices. For the ease of illustration, a single disk drive 100 is shown according to one embodiment. The disk drive 100 includes at least one rotatable magnetic disk 112 supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read/write heads, such as a write head including a spintronic device. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air or gas bearing between the slider 113 and the disk surface 122 which exerts an upward force or lift on the slider 113. The air or gas bearing thus counter-balances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
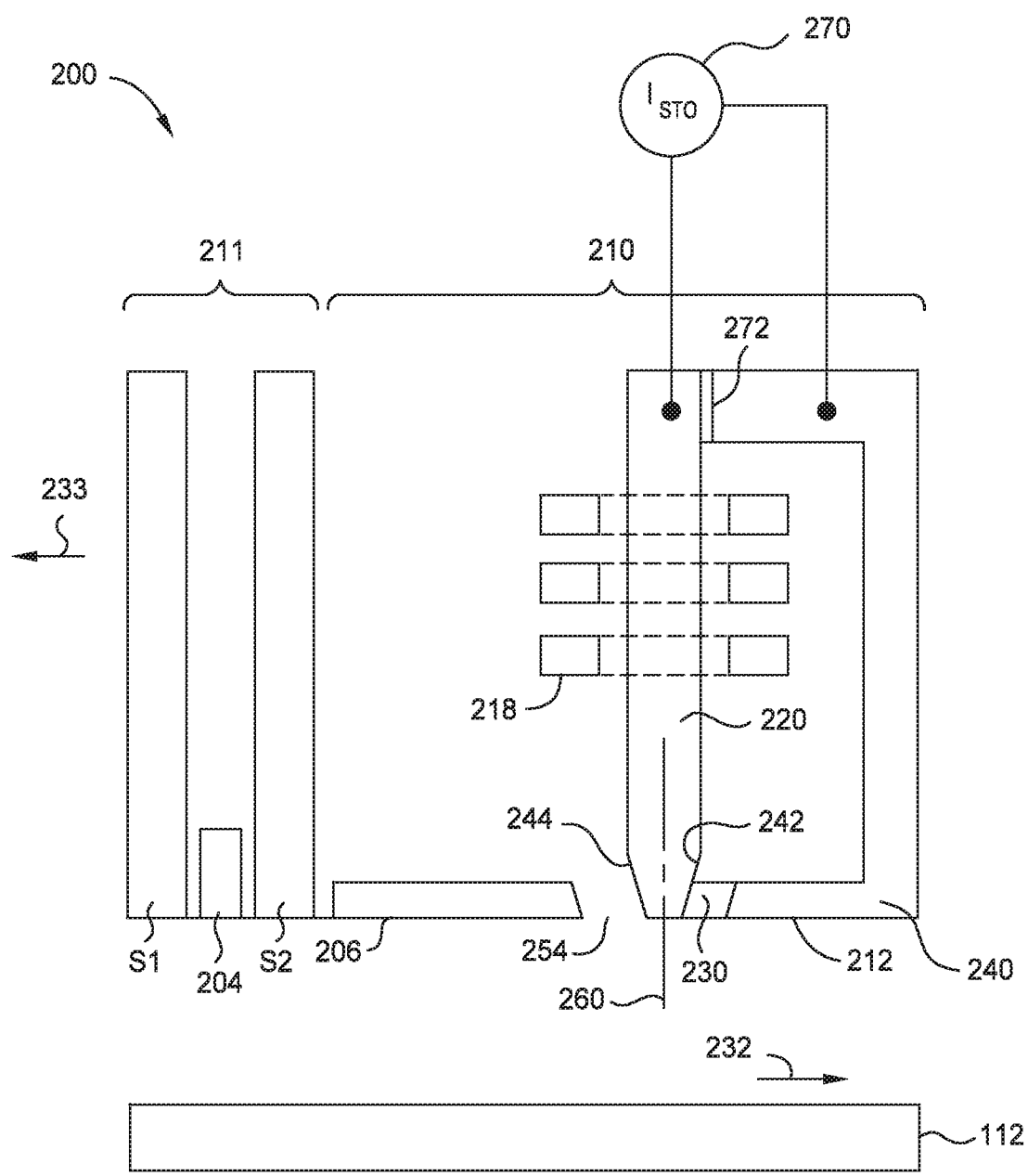
FIG. 2 is a schematic illustration of certain embodiments of a cross sectional side view of a head assembly facing a magnetic recording medium.

FIG. 2 is a schematic illustration of certain embodiments of a cross sectional side view of a head assembly 200 facing the magnetic disk 112 or other magnetic storage medium. The head assembly 200 may correspond to the head assembly 121 described in FIG. 1. The head assembly 200 includes a media facing surface (MFS) 212 facing the disk 112. As shown in FIG. 2, the magnetic disk 112 relatively moves in the direction indicated by the arrow 232 and the head assembly 200 relatively moves in the direction indicated by the arrow 233.

In some embodiments, the head assembly 200 includes a magnetic read head 211. The magnetic read head 211 may include a sensing element 204 disposed between shields S1 and S2. In certain embodiments, the sensing element 204 is a magnetoresistive (MR) sensing element, such an element exerting a tunneling magneto-resistive (TMR) effect, a magneto-resistance (GMR) effect, an extraordinary magneto-Resistive (EMR) effect, or a spin torque oscillator (STO) effect. The magnetic fields of magnetized regions in the magnetic disk 112, such as perpendicular recorded bits or longitudinal recorded bits, are detectable by the sensing element 204 as the recorded bits.

The head assembly 200 includes a write head 210. In certain embodiments, the write head 210 includes a main pole 220, a leading shield 206, a trailing shield (TS) 240, and a spintronic device 230 disposed between the main pole 220 and the TS 240. The main pole 220 serves as a first electrode. Each of the main pole 220, the spintronic device 230, the leading shield 206, and the trailing shield (TS) 240 has a front portion at the MFS.

The main pole 220 comprises a magnetic material, such as CoFe, CoFeNi, or FeNi, other suitable magnetic materials. In certain embodiments, the main pole 220 comprises small grains of magnetic materials in a random texture, such as body-centered cubic (BCC) materials formed in a random texture. For example, a random texture of the main pole 220 may be formed by electrodeposition. The write head 210 includes a coil 218 around the main pole 220 that excites the main pole 220 producing a writing magnetic field for affecting a magnetic recording medium of the rotatable magnetic disk 112. The coil 218 may be a helical structure or one or more sets of pancake structures.

In certain embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In some embodiments, the main pole 220 does not include the trailing taper 242 and the leading taper 244. Instead, the main pole 220 includes a trailing side (not shown) and a leading side (not shown) in which the trailing side and the leading side are substantially parallel.

The TS 240 comprises a magnetic material, such as FeNi, or other suitable magnetic materials, serving as a second electrode and return pole for the main pole 220. The leading shield 206 may provide electromagnetic shielding and is separated from the main pole 220 by a leading gap 254.

The spintronic device 230 is positioned proximate the main pole 220 and reduces the coercive force of the magnetic recording medium, so that smaller writing fields can be used to record data. An electron current is applied to spintronic device 230 from a current source ($I_{STO}$) 270 to produce a microwave field. The electron current may be a direct current (DC) waveforms, pulsed DC waveforms, and/or pulsed current waveforms going to positive and negative voltages, or other suitable waveforms.

In certain embodiments, the spintronic device 230 may be electrically coupled to the main pole 220 and the TS 240 in which the main pole 220 and the TS are separated by an insulating layer 272. The current source 270 may provide electron current to the spintronic device 230 through the main pole 220 and the TS 240. For direct current or pulsed current, the current source 270 may flow electron current from the main pole 220 through the spintronic device 230 to the TS 240 or may flow electron current from the TS 240 through the spintronic device 230 to the main pole 220 depending on the orientation of the spintronic device 230. In other embodiments, the spintronic device 230 may be coupled to electrical leads providing an electron current other than from the main pole and/or the TS.

Figure 3:
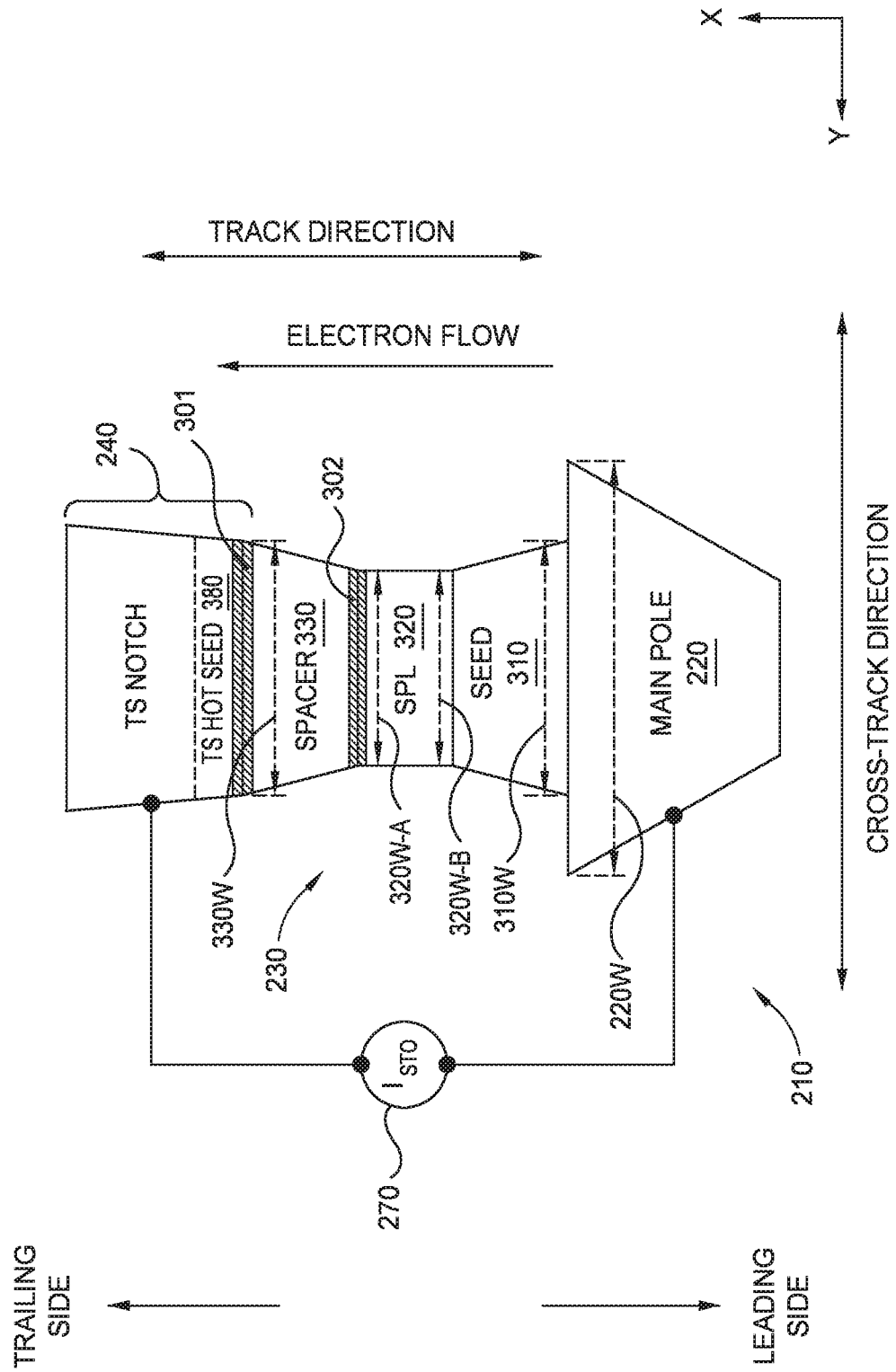
FIGS. 3-6 are schematic illustrations of certain embodiments of a write head of FIG. 2 with a spintronic device between a main pole and a trailing shield.

FIG. 3 is a schematic illustration of certain embodiments of a plan view of a MFS of the write head 210 of FIG. 2 with a spintronic device 230 between a main pole 220 and a TS 240 in the track direction. The spintronic device 230 comprises a seed layer 310, a spin polarization layer 320, and a spacer layer 330. The sides of the spintronic device 230 at a MFS are ion milled or patterned, for example, to form the spintronic device shape as shown.

The seed layer 310 is over the main pole 220. The SPL 320 is over the seed layer 310. The spacer layer 330 is over the SPL 320. A TS hot seed layer 380 is over the spacer layer 330. The TS hot seed layer 380 is magnetically stitched with a notch of the TS 240.

A current source 270 is configured to supply an electron flow from the main pole 220 through the spintronic device 230 to the TS 240. Polarized electrons from the SPL 320 are reflected from a first interface 301 between the TS 240 and the spacer layer 330, such as between the TS hot seed layer 380 and the spacer layer, to the SPL 320. Spin accumulation and spin torque occurs at a second interface 302 between the spacer layer 330 and the SPL 320. The spin torque acts on the SPL 320 causing spin flipping of the SPL 320 and precession of the magnetization of the SPL 320. Precession of the magnetization of the SPL 320 can generate an assisting magnetic field, such as a DC field, emitted to a magnetic recording medium. The assisting magnetic field reduces the coercive force of the recording medium and reduces the required write field from the main pole 220 to write to the recording medium.

The bias voltage (Vjump) at which spin flipping occurs is estimated according to formula (1):

$$\text{Vjump} = J_c * RA \quad (1)$$

in which $J_c$ is the critical current density for STT switching against the gap field.

The spin torque efficiency of the SPL 320 is inversely proportional to the bias voltage (Vjump) at which spin flipping occurs. The current density J at the second interface 302 generating spin torque is estimated according to the formula (2):

$$J = \frac{V}{\rho t}\left\{\frac{A_1}{A_1 + A_2}\right\} \quad (2)$$

in which $A_1$ is the area of the first interface 301, $A_2$ is the area of the second interface 302, in which the SPL 320 and spacer layer 330 are assumed to have the same resistivity p, and in which the SPL 320 and spacer layer 330 are assumed to have the same thickness t for purposes to simplify the estimation. $V_{jump,2}$ of spintronic 230 of FIG. 3 with a first interface 301 having a different area than a second interface 302 is estimated by the following formula (3):

$$V_{jump,2} = \frac{V_{jump,1}}{2}\left(1 + \frac{A_2}{A_1}\right) \quad (3)$$

in which $V_{jump,1}$ is of a spintronic device 230 having a first interface 301 and a second interface 302 having the same area.

From formula (3), $V_{jump,2}$ is proportional to $A_2/A_1$. When area $A_1$ of first interface 301 is larger than the area $A_2$ of second interface 302 ($A_1 > A_2$), the spintronic device 230 of FIG. 3 has a lower Vjump and a higher spin torque efficiency than a spintronic device with $A_1 \leq A_2$. $A_1 > A_2$ provides lower Vjump and higher spin torque efficiency for spintronic device 230 when the resistivity of the SPL 320 and the spacer layer 330 are the same or different and when the thicknesses of the SPL 320 and the spacer layer 330 are the same or different. One example of when $A_1 > A_2$ is when a cross-track width 330W of a MFS of the spacer layer 330 proximate the TS 240 is larger than a cross-track width 320W-A of a media facing surface of the SPL 320 proximate the spacer layer 330. In other words, when 330W>320W-A, a spintronic device 230 has a lower Vjump and higher spin torque efficiency than when 330W≤320W-A. FIG. 3 shows the spacer layer 330 as a trapezoidal shape at a MFS with straight tapered sides from the TS 240 to the SPL 320. In other embodiments, the spacer layer 330 is any suitable trapezoidal shape at a MFS with one or two straight tapered sides from the TS 240 to the SPL 320. In other embodiments, the spacer layer 330 is any suitable shape at a MFS with one or two continuous curved tapered sides from the TS 240 to the SPL 320.

In certain embodiments, a cross-track width 310W of a MFS of the seed layer 310 proximate the main pole 220 larger than a cross-track width 320W-B of a MFS of the SPL 320 proximate the seed layer 310 minimizes a parasitic resistance of the seed layer 310. In other words, when 310W>320W-B, the seed layer 310 has a lower parasitic resistance. In certain embodiments, the seed layer 310 has a cross-track width 310W larger than a cross-track width 320W-B of the SPL 320 (i.e., 310W>320W-B) but smaller than the cross-track width 220W of the main pole 220 proximate the seed layer 310 (i.e., 310W<220W). FIG. 3 shows the seed layer 310 as a trapezoidal shape at a MFS with straight tapered sides from the MP 220 to the SPL 320 at a MFS. In other embodiments, the seed layer 310 is any trapezoidal shape at a MFS with one or two straight tapered sides from the MP 220 to the SPL 320. In other embodiments, the seed layer 310 is any suitable shape at a MFS with one or two continuous curved tapered sides from the MP 220 to the SPL 320.

Figure 4:
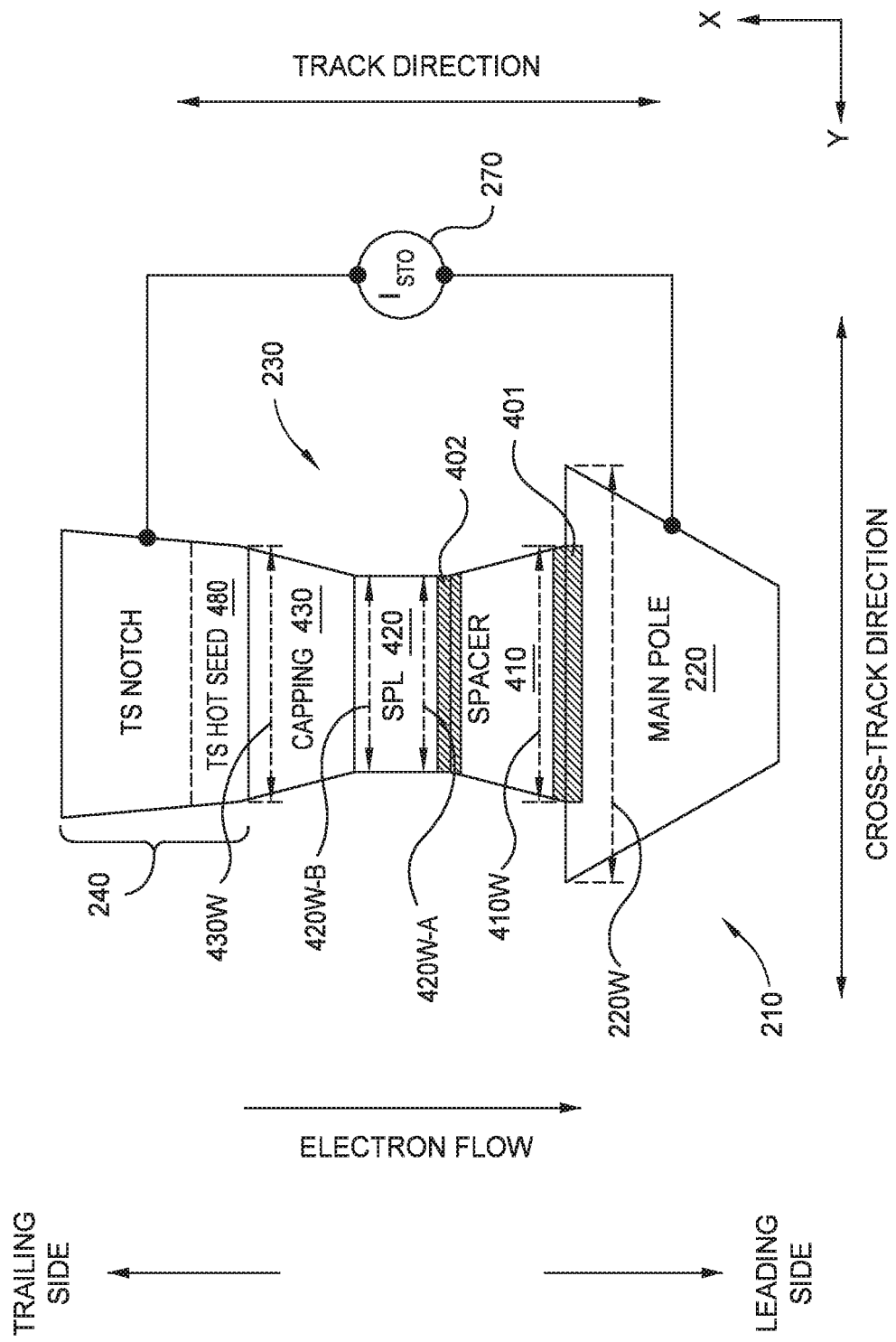

FIG. 4 is a schematic illustration of certain embodiments of a plan view of a MFS of the write head 210 of FIG. 2 with a spintronic device 230 between a main pole 220 and a TS 240 in the track direction. The spintronic device 230 comprises a spacer layer 410, a spin polarization layer (SPL) 420, and a capping layer 430. The sides of the spintronic device 230 at a MFS are ion milled or patterned, for example, to form the spintronic device shape as shown.

The spacer layer 410 is over the main pole 220. The SPL 420 is over the spacer layer 410. The capping layer 430 is over the SPL 420. A TS hot seed layer 480 is over the capping layer 430. The TS hot seed layer 480 is magnetically stitched with a notch of the TS 240.

A current source 270 is configured to supply an electron flow from the TS 240 through the spintronic device 230 to the main pole 220. Polarized electrons from the SPL 420 are reflected from a first interface 401 between the main pole 220 and the spacer layer 410. Spin accumulation and spin torque occurs at a second interface 402 between the spacer layer 410 and the SPL 420. The spin torque acts on the SPL 420 causing spin flipping of the SPL 420 and precession of the magnetization of the SPL 420. Precession of the magnetization of the SPL 420 can generate an assisting magnetic field, such as a DC field, emitted to a magnetic recording medium. The assisting magnetic field reduces the coercive force of the recording medium and reduces the required write field from the main pole 220 to write to the recording medium.

The spin torque efficiency of the SPL 420 is inversely proportional to the bias voltage (Vjump) at which spin flipping occurs. The current density J at the second interface 402 generating spin torque is estimated according to the above formula (2) in which $A_1$ is the area of the first interface 401, $A_2$ is the area of the second interface 402, in which the SPL 420 and spacer layer 410 are assumed to have the same resistivity p, and in which the SPL 420 and spacer layer 410 are assumed to have the same thickness t for purposes of simplifying the estimation. $V_{jump,2}$ of spintronic 230 of FIG. 4 with a first interface 401 having a different area than a second interface 402 is estimated by the above formula (3) in which $V_{jump,1}$ is of a spintronic device 230 having a first interface 401 and a second interface 402 having the same area.

From formula (3), $V_{jump,2}$ is proportional to $A_2/A_1$. When area $A_1$ of first interface 401 is larger than the area $A_2$ of second interface 402 ($A_1>A_2$), the spintronic device 230 of FIG. 4 has a lower Vjump and a higher spin torque efficiency than a spintronic device with $A_1 \le A_2$. $A_1>A_2$ provides lower Vjump and higher spin torque efficiency for spintronic device 230 when the resistivity of the SPL 420 and the spacer layer 410 are the same or different and when the thicknesses of the SPL 420 and the spacer layer 410 are the same or different. One example of when $A_1>A_2$ is when a cross-track width 410W of a MFS of the spacer layer 410 proximate the main pole 220 is larger than a cross-track width 420W-A of a MFS of the SPL 420 proximate the spacer layer 410. In other words, when 410W>420W-A, a spintronic device 230 has a lower Vjump and higher spin torque efficiency than when 410W≤420W-A. FIG. 4 shows the spacer layer 410 as a trapezoidal shape at a MFS with straight tapered sides from the MP 220 to the SPL 420 at a MFS. In other embodiments, the spacer layer 410 is any suitable trapezoidal shape at a MFS with one or two straight tapered sides from the MP 220 to the SPL 420. In other embodiments, the spacer layer 410 is any suitable shape at a MFS with one or two continuous curved tapered sides from the MP 220 to the SPL 420.

In certain embodiments, a cross-track width 430W of a MFS of the capping layer 430 proximate the TS 240 larger than a cross-track width 420W-B of a MFS of the SPL 420 proximate the capping layer 430 minimizes a parasitic resistance of the capping layer 430. In other words, when 430W>420W-B, the capping layer 430 has a lower parasitic resistance. FIG. 4 shows the capping layer 430 as a trapezoidal shape at a MFS with straight tapered sides from the TS 240 to the SPL 420 at a MFS. In other embodiments, the capping layer 430 is any trapezoidal shape at a MFS with one or two straight tapered sides from the TS 240 to the SPL 420 at a MFS. In other embodiments, the capping layer 430 is any suitable shape at a MFS with one or two continuous curved tapered sides from the TS 240 to the SPL 420.

Figure 5:
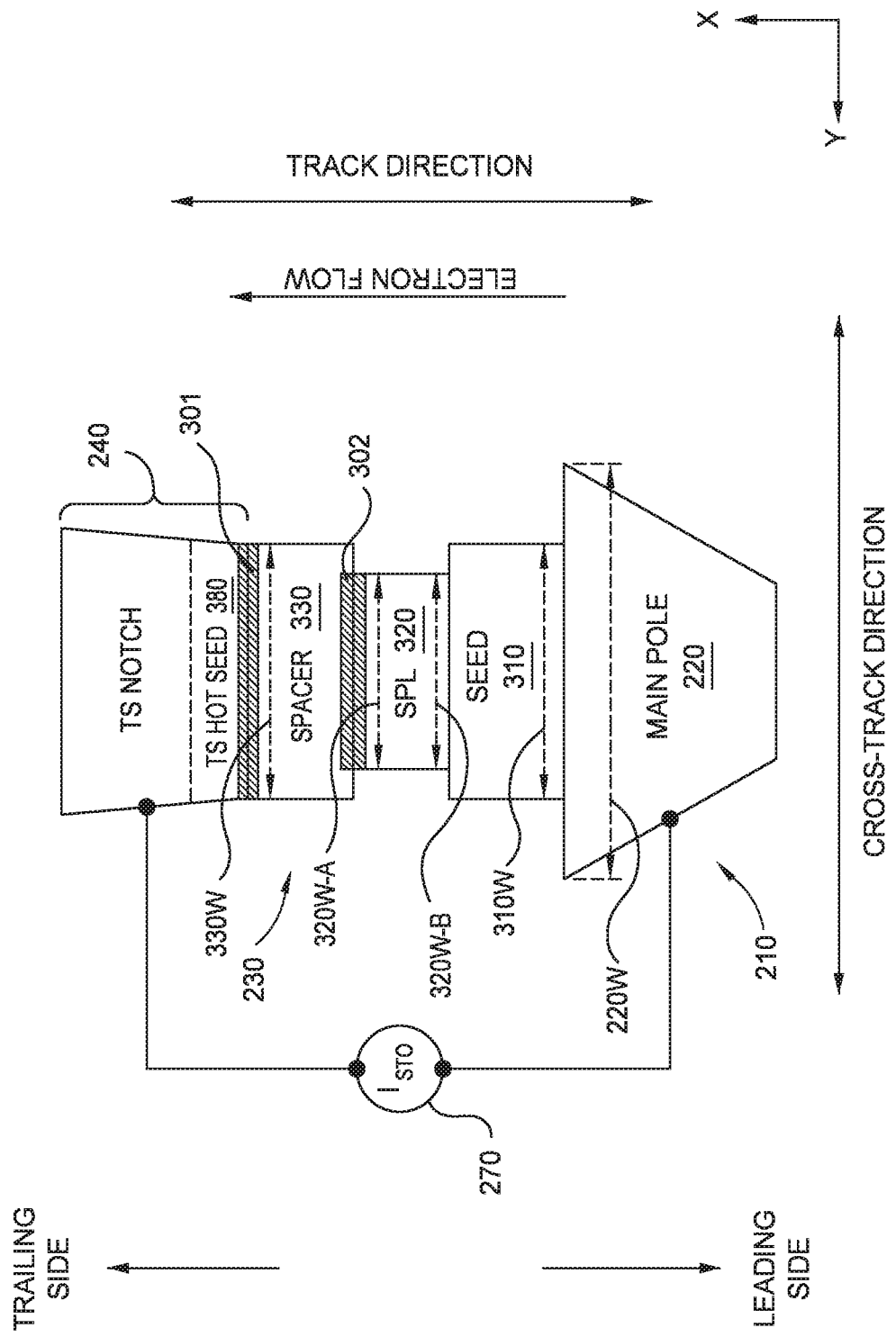
Figure 6:
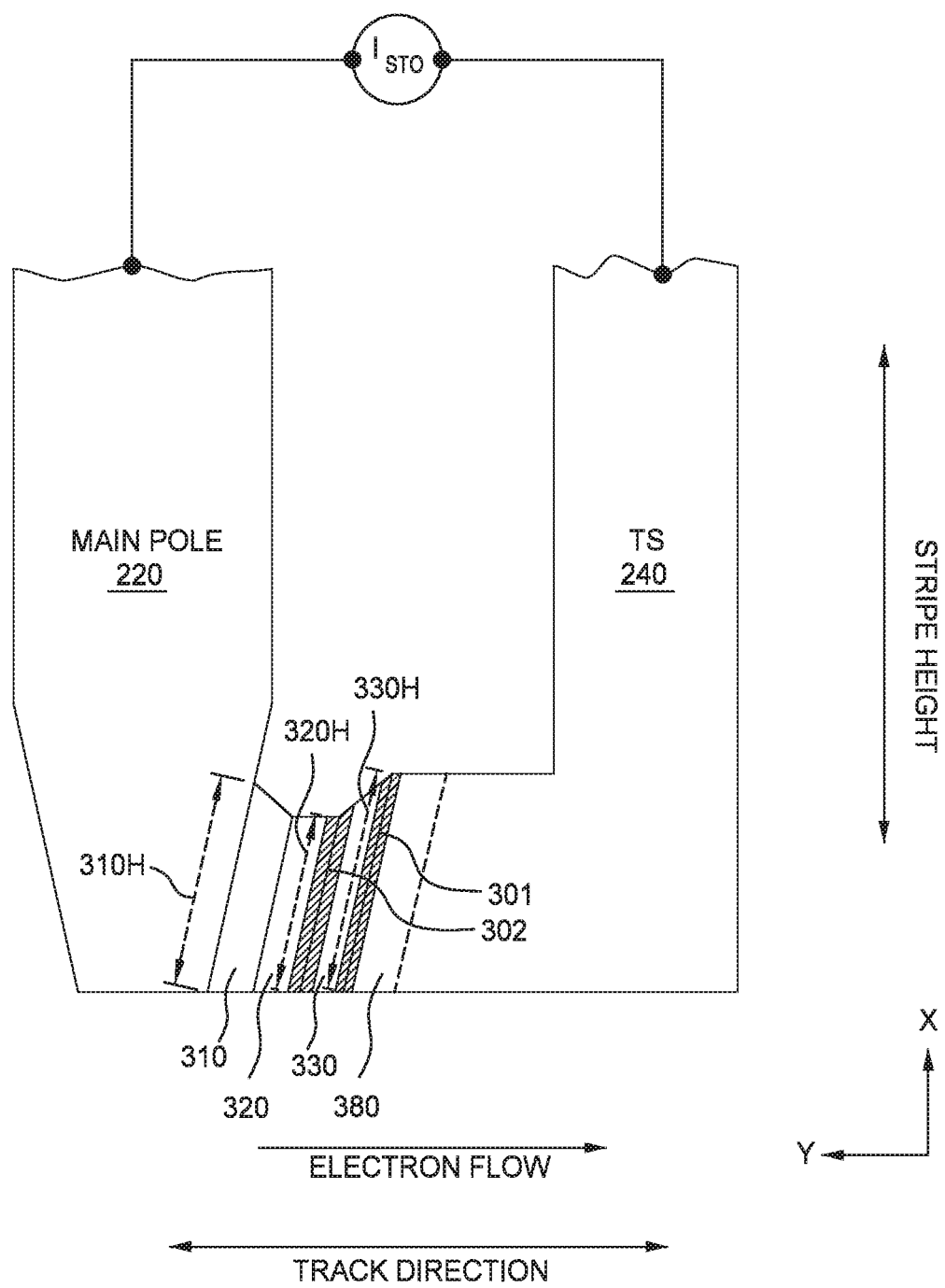

FIG. 5 is a schematic illustration of certain embodiments of a plan view of a MFS of a spintronic device 230 with a SPL 320 that is recessed from the spacer layer 330 at a MFS. The spintronic device 230 of FIG. 5 comprises the same layers in the same order as the spintronic device 230 of FIG. 3 but with different dimensions. FIG. 6 is a schematic illustration of certain embodiments of a cross-sectional throat view of a spintronic device 230 with a stripe height 330H of a spacer layer 330 that is larger than a stripe height 320H of the SPL 320. The spacer layer 330 can be tapered or non-tapered (not shown). The spintronic device 230 of FIG. 6 comprises the same layers in the same order as the spintronic device 230 of FIG. 3 but with different dimensions.

FIG. 3, FIG. 5, and FIG. 6 each shows different embodiments of a spintronic device 230 with area $A_1$ of a first interface 301 larger than the area $A_2$ of second interface 302 ($A_1>A_2$). In FIG. 3, the spacer layer 330 is tapered with a cross-track width 330W at a MFS that is larger than a cross-track width 320W-A of the SPL 320. In FIG. 5, the SPL 320 is recessed from the spacer layer 330 so that the spacer layer 330 has a cross-track width 330W at a MFS that is larger than a cross-track width 320W-A of the SPL 320. In FIG. 6, the spacer layer 330 is tapered or non-tapered (not shown) with a stripe height 330H that is larger than a stripe height 320H of the SPL 320. In certain embodiments, the spintronic device 230 with area $A_1$ of a first interface 301 larger than the area $A_2$ of second interface 302 ($A_1>A_2$) comprises a spacer layer 330 with both a cross-track width 330W at a MFS and a stripe height 330H respectively larger than a cross-track width 320W-A at a MFS and a stripe height 320H of the SPL 320. Therefore, in certain embodiments, a spacer layer has a tapered cross-track width larger than a cross-track width of a SPL. In certain embodiments, a spacer layer has a recessed cross-track width larger than a cross-track width of a SPL. In certain embodiments, a spacer layer has a stripe height larger than a stripe height of a SPL. In certain embodiments, a spacer layer has both a cross-track width and a stripe height larger than a cross-track width and a stripe height of the SPL.

As shown in FIG. 5, the SPL 320 is recessed from the seed layer 310 at a MFS. In FIG. 6, the seed layer 310 is tapered or non-tapered (not shown) in which the stripe height 310H of the seed layer 310 is larger than the stripe height 320H of the SPL 320. FIG. 3, FIG. 5, and FIG. 6 each shows different embodiments of a seed layer 310 of a spintronic device 230 with reduced parasitic resistance. In FIG. 3, the seed layer 310 is tapered with a cross-track width 310W at a MFS that is larger than a cross-track width 320W-B of the SPL 320. In FIG. 5, the SPL 320 is recessed from the seed layer 310 so that the seed layer 310 has a cross-track width 310W at a MFS that is larger than a cross-track width 320W-B of the SPL 320. In FIG. 6, the seed layer 310 is tapered (as shown) or non-tapered (not shown) with a stripe height 310H that is larger than a stripe height 320H of the SPL 320. In certain embodiments, the spintronic device 230 with a seed layer 310 of a spintronic device 230 with reduced parasitic resistance comprises a seed layer 310 with both a cross-track width 310W at a MFS and a stripe height 310 larger than a cross-track width 320W-B at a MFS and a stripe height 320 of the SPL 320. Therefore, in certain embodiments, a seed layer has a tapered cross-track width larger than a cross-track width of a SPL. In certain embodiments, a seed layer has a recessed cross-track width larger than a cross-track width of a SPL. In certain embodiments, a seed layer has a stripe height larger than a stripe height of a SPL. In certain embodiments, a seed layer has both a cross-track width and a stripe height larger than a cross-track width and a stripe height of the SPL.

In other embodiments (not shown) of the spintronic device 230 of FIG. 4, the SPL 420 is recessed from the spacer layer 410 in which area $A_1$ of a first interface 401 is larger than the area $A_2$ of second interface 402 ($A_1 > A_2$). In other embodiments (not shown) of the spintronic device 230 of FIG. 4, the spacer layer 410 is tapered or non-tapered with a stripe height larger than a stripe height of the SPL 420 in which area $A_1$ of a first interface 401 is larger than the area $A_2$ of second interface 402 ($A_1 > A_2$). In certain embodiments, the spintronic device 230 with area $A_1$ of a first interface 401 larger than the area $A_2$ of second interface 402 ($A_1 > A_2$) comprises a spacer layer 410 with both a cross-track width 410W at a MFS and a stripe height respectively larger than a cross-track width 420W-A at a MFS and a stripe height of the SPL 420.

In other embodiments (not shown) of the spintronic device 230 of FIG. 4, the SPL 420 is recessed from the capping layer 430 at a MFS so that a cross-track width 430W of the capping layer 430 is larger than a cross-track width 420W-B of the SPL 420 to provide reduced parasitic resistance of the capping layer 430. In other embodiments (not shown) of the spintronic device 230 of FIG. 4, the capping layer 430 is tapered or non-tapered with a stripe height that is larger than a stripe height of the SPL 420. In certain embodiments (not shown), a capping layer 430 of a spintronic device 230 with reduced parasitic resistance has both a cross-track width 430W at a MFS and a stripe height respectively larger than a cross-track width 420W-B at a MFS and a stripe height of a SPL 420.

FIGS. 3-6 show certain embodiments in which the spintronic device 230 further includes a wide spacer layer 330, 420, a narrow SPL 320, 420, and a wide seed layer 310/capping layer 430. For example, the spintronic device 230 as shown in FIGS. 3-4 has a media facing surface that is hourglass shaped. In other embodiments, the spintronic device 230 includes a wide spacer layer 330, 410 with a narrow SPL 320, 420 regardless of the dimension/shape of the seed layer 310/capping layer 430.

The seed layer 310 of spintronic device 230 of FIG. 3, FIG. 5, and FIG. 6 can comprise ruthenium, copper, tantalum, other non-magnetic materials, alloys thereof, or multiple layers thereof. For example, a seed layer can comprise a multiple layer stack comprising at least a non-magnetic layer, such as a stack comprises Cr, NiFeTa, Ta, NiAl, Ru, and combinations thereof.

The SPL 320, 420 of the spintronic device 230 of FIGS. 3-6 can comprise NiFe, CoFe, CoFeNi, CoMnGe, NiCo, NiFeCu, CoFeMnGe, CoMnSi, CoFeSi, other soft or hard ferromagnetic materials, other Heusler alloys, other suitable magnetic layers, or multiple layers thereof. The SPL can comprise a material having magnetic anisotropy oriented in any general direction, such as perpendicular, angled, or longitudinal, to the plane of the MFS.

The spacer layer 330, 410 of the spintronic device 230 of FIGS. 3-6 can comprise one or more non-magnetic conductive materials, such as Au, Ag, Al, Cu, AgSn, NiAl, other non-magnetic conductive materials, alloys thereof, or multiple layers thereof. The spacer layer may be made of a material having a high spin transmissivity for spin torque transfer on the SPL.

The capping layer 430 of the spintronic device 230 of FIG. 4 can comprise one or more layers of non-magnetic conductive materials, metals or metal alloys of NiAl, Cr, Ru, Ir, Ta, Ti, and other non-magnetic metals. The capping layer 430 may protect the spintronic device 230 during formation of the spintronic device and formation of the write head 210, such as during deposition, annealing, patterning, cleaning, etc.

The main pole 220 of the write head 210 of FIGS. 3-6 may be any suitable shape (i.e., trapezoidal, triangular, etc.) and suitable dimensions. The write head 210 of FIGS. 3-6 may include a leading shield (not shown) positioned on one or more sides of the main pole 220 with a leading gap therebetween. The write head 210 of FIGS. 3-6 may include a side gap positioned on the sides of the spintronic device 230. The side gap may comprise an insulating material.

In FIGS. 3-5, the track direction is labeled as the x-coordinate and the cross-track direction is labeled as the y-coordinate. The perpendicular direction to the MFS would be the z-coordinate into/out of the X-Y plane. In FIG. 6, the track direction is labeled as the x-coordinate and the general stripe height direction is labeled in the z-coordinate.

EXAMPLES

Figure 7:
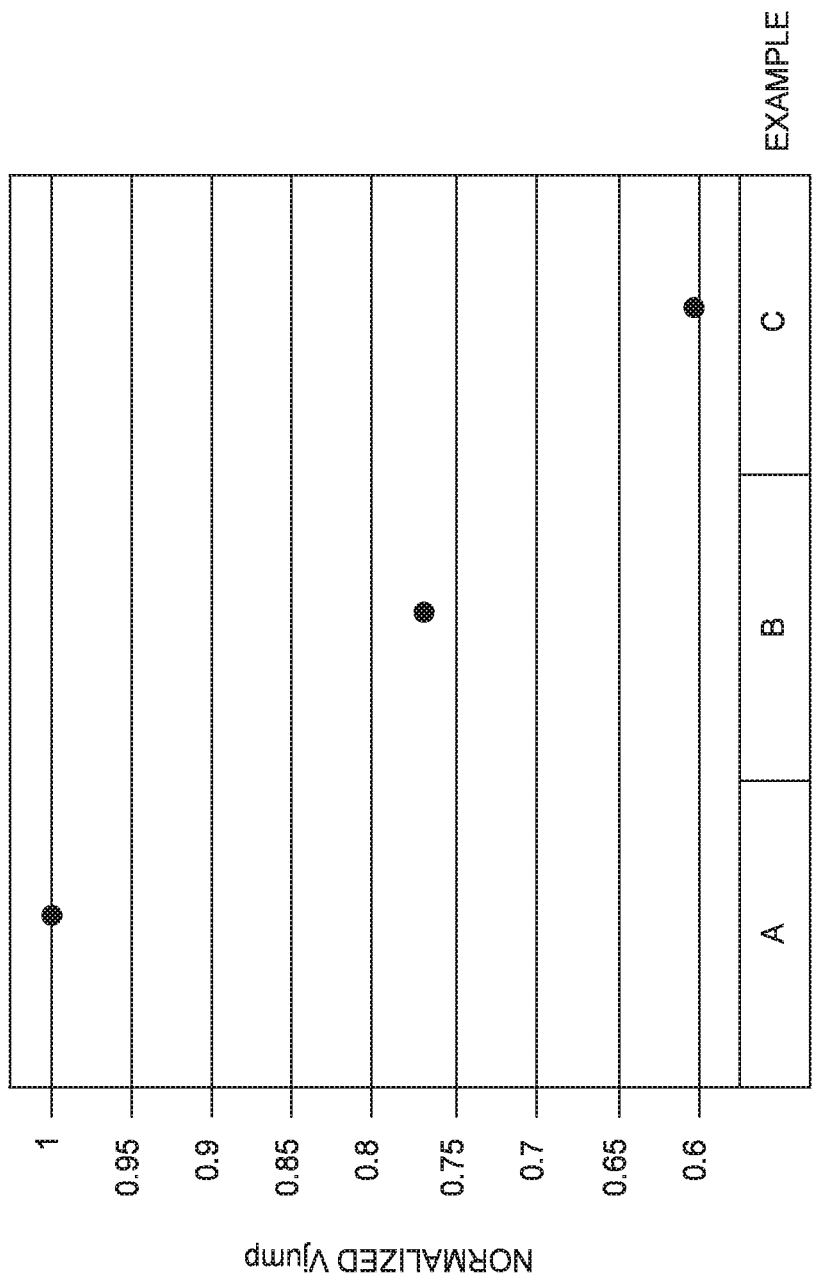
FIG. 7 is a chart of normalized Vjump/Bst of various examples of spintronic devices.

Test chips where formed of spintronic devices of Comparative Example A, Example B, and Example C. The Vjump over the magnetic flux density product of the thickness of the SPL (Vjump/Bst) was measured. The Vjump/Bst were normalized on a scale from zero to 1 and plotted on FIG. 7. The Examples are not meant to limit the scope of the claims unless expressly recited as part of the claims.

Comparative Example A

A comparative spintronic device was formed including a seed layer on a bottom electrode, a SPL on the seed layer, a spacer layer on the SPL, a TS hot seed layer formed on the spacer layer, a capping layer formed on the TS hot seed layer, and a top electrode formed on the capping layer. An electron flow was supplied through the spintronic device towards the trailing shield notch. The comparative spintronic device had a spacer layer-TS interface with an area $A_1$ smaller than an area $A_2$ of a spacer layer-SPL interface in which $A_1 < A_2$, dissimilar to the spintronic device of FIG. 3, FIG. 5, and FIG. 6.

Example B

A spintronic device was formed including a seed layer on the MP, a MP notch formed on the seed layer, a spacer layer on the MP notch, a SPL on the spacer layer, a capping layer on the SPL, a top electrode formed on the capping layer. An electron flow was supplied through the spintronic device towards the main pole. The spintronic device had a spacer layer-MP interface with an area $A_1$ larger than an area $A_2$ of a spacer layer-SPL interface in which $A_1 > A_2$, similar to the spintronic device of FIG. 4. Since the device of Example B has the same layers as Example A except in a different order and with a consequently different shape, Example B shows the effect of the spintronic device shape on switching characteristics without regard to parasitic resistance effects.

Example C

A spintronic device was formed including a spacer layer on the MP, a SPL on the spacer layer, a capping layer on the SPL, and a top electrode. An electron flow was supplied through the spintronic device towards the main pole. The spintronic device had a spacer layer-MP interface larger with an area $A_1$ than an area $A_2$ of a spacer layer-SPL interface in which $A_1 > A_2$.

Examples B-C showed lower Vjump and high spin torque efficiency than Example A. Example C showed lower Vjump and high spin torque efficiency than Example B since the spintronic device of Example B includes a seed layers with parasitic resistance.

In one embodiment, a write head includes a main pole. A seed layer is over the main pole. A spin polarization layer (SPL) is over the seed layer. A spacer layer is over the SPL. A trailing shield is over the spacer layer. The spacer layer forms a first interface between the spacer layer and the trailing shield and forms a second interface between the spacer layer and the SPL. The first interface has an area larger than an area of the second interface.

In another embodiment, a write head includes a main pole. A spacer layer is over the main pole. A SPL is over the spacer layer. A capping layer is over the SPL. A trailing shield is over the capping layer. The spacer layer forms a first interface between the spacer layer and the main pole and forms a second interface between the spacer layer and the SPL. The first interface has an area larger than an area of the second interface.

In still another embodiments, a write head includes a main pole and a trailing shield. A SPL and a spacer layer are between the main pole and the trailing shield. The spacer layer has a cross-track width larger than a cross-track width of the SPL and/or has and a stripe height larger than a stripe height of the SPL.

While the foregoing is directed to embodiments of the present disclosure, other and further embodiments of the disclosure may be devised without departing from the basic scope thereof, and the scope thereof is determined by the claims that follow.

What is claimed is:

1. A write head, comprising:
   a main pole;
   a seed layer over the main pole;
   a spin polarization layer (SPL) over the seed layer;
   a spacer layer over the SPL; and
   a trailing shield over the spacer layer,
   wherein the spacer layer forms a first interface between the spacer layer and the trailing shield and forms a second interface between the spacer layer and the SPL, the first interface having an area larger than an area of the second interface,
   wherein the seed layer has a cross-track width proximate the main pole larger than a cross-track width of the SPL proximate the seed layer.

2. The write head of claim 1, wherein the spacer layer has a cross-track width proximate the trailing shield that is larger than a cross-track width of the SPL proximate the spacer layer.

3. The write head of claim 2, wherein the spacer layer is trapezoidal or tapered in shaped at a media facing surface.

4. The write head of claim 2, wherein the SPL is recessed from the spacer layer.

5. The write head of claim 1, wherein the spacer layer has a stripe height larger than a stripe height of the SPL.

6. The write head of claim 1, wherein the seed layer has a stripe height larger than a stripe height of the SPL.

7. The write head of claim 1, further comprising a current source coupled to the main pole and the trailing shield, the current source configured to supply an electron flow from the main pole through the SPL to the trailing shield, wherein a magnetization of the SPL is configured to oscillate due to spin torque acting on the SPL from the second interface between the spacer layer and the SPL.

8. A hard disk drive comprising the write head of claim 1.

9. A write head, comprising:
   a main pole;
   a spacer layer over the main pole;
   a spin polarization layer (SPL) over the spacer layer;
   a capping layer over the SPL; and
   a trailing shield over the capping layer,
   wherein the spacer layer forms a first interface between the spacer layer and the main pole and forms a second interface between the spacer layer and the SPL, the first interface having an area larger than an area of the second interface,
   wherein the capping layer has a cross-track width proximate the trailing shield larger than a cross-track width of the SPL proximate the capping layer.

10. The write head of claim 9, wherein the spacer layer has a cross-track width proximate the main pole that is larger than a cross-track width of the SPL proximate the spacer layer.

11. The write head of claim 10, wherein the spacer layer is trapezoidal or tapered in shaped at a media facing surface.

12. The write head of claim 10, wherein the SPL is recessed from the spacer layer.

13. The write head of claim 9, wherein the spacer layer has a stripe height larger than a stripe height of the SPL.

14. The write head of claim 9, wherein the capping layer has a stripe height larger than a stripe height of the SPL.

15. The write head of claim 9, further comprising a current source coupled to the main pole and the trailing shield, the current source configured to supply an electron flow from the trailing shield through the SPL to the main pole, wherein a magnetization of the SPL is configured to oscillate due to spin torque acting on the SPL from the second interface between the spacer layer and the SPL.

16. A hard disk drive comprising the write head of claim 9.

* * * * *